(12) United States Patent
Brunckhorst et al.

(10) Patent No.: US 11,602,963 B2
(45) Date of Patent: *Mar. 14, 2023

(54) TRAILER-MOUNTED MOCK LANDING GEAR

(71) Applicant: The Boeing Company, Chicago, IL (US)

(72) Inventors: Christian Brunckhorst, Bellevue, WA (US); Nicholas James Brimlow, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,664

(22) Filed: Jan. 13, 2022

(65) Prior Publication Data

US 2022/0134819 A1 May 5, 2022

Related U.S. Application Data

(62) Division of application No. 16/359,477, filed on Mar. 20, 2019, now Pat. No. 11,260,708, which is a
(Continued)

(51) Int. Cl.
*B60D 1/48* (2006.01)
*B64F 1/22* (2006.01)
(Continued)

(52) U.S. Cl.
CPC ............ *B60D 1/486* (2013.01); *B60D 1/07* (2013.01); *B60D 1/145* (2013.01); *B60D 1/248* (2013.01);
(Continued)

(58) Field of Classification Search
CPC .......... B60D 1/486; B60D 1/07; B60D 1/145; B60D 1/248; B60D 1/26; B64F 5/60; B64F 1/227

See application file for complete search history.

(56) References Cited

U.S. PATENT DOCUMENTS 3,899,188 A 8/1975 Curry
4,923,253 A 5/1990 Pollner et al.
(Continued)

FOREIGN PATENT DOCUMENTS

CN 1076902 A 10/1993
CN 201881925 U 6/2011
(Continued)

OTHER PUBLICATIONS

First Office Action issued by the Chinese Patent Office in Application No. 20171122213X dated Jun. 24, 2022.
(Continued)

*Primary Examiner* — Kevin Hurley
*Assistant Examiner* — Michael R Stabley
(74) *Attorney, Agent, or Firm* — McDonnell Boehnen Hulbert & Berghoff LLP

(57) ABSTRACT

An example apparatus is configured to couple to a trailer and a tow vehicle. The apparatus includes a frame; one or more clamps mounted to the frame and configured to couple the frame to an underplate of the trailer; and a shaft having a first end rotatably coupled to the frame and a second end configured to couple to at least one replicated element of a towed vehicle. The at least one replicated element is configured to engage the tow vehicle.

9 Claims, 11 Drawing Sheets

Related U.S. Application Data division of application No. 15/367,981, filed on Dec. 2, 2016, now Pat. No. 10,279,637.

(51) Int. Cl.

| | |
|---|---|
| *B64F 5/60* | (2017.01) |
| *B60D 1/07* | (2006.01) |
| *B60D 1/145* | (2006.01) |
| *B60D 1/24* | (2006.01) |
| *B60D 1/26* | (2006.01) |

(52) U.S. Cl.
CPC ............... *B64F 1/227* (2013.01); *B64F 5/60* (2017.01); *B60D 1/26* (2013.01); *B60Y 2410/102* (2013.01)

(56) References Cited

U.S. PATENT DOCUMENTS

| | | |
|---|---|---|
| 5,562,388 A | 10/1996 | LeGall et al. |
| 7,975,959 B2 | 7/2011 | Perry et al. |
| 8,245,980 B2 | 8/2012 | Perry et al. |
| 8,515,594 B2 | 8/2013 | Perry et al. |
| 8,774,983 B2 | 7/2014 | Perry et al. |
| 10,279,637 B2 | 5/2019 | Brunckhorst et al. |
| 2005/0196256 A1 | 9/2005 | Rodenkirch et al. |

FOREIGN PATENT DOCUMENTS

| | | |
|---|---|---|
| CN | 102239087 A | 11/2011 |
| CN | 202 243 127 | 5/2012 |
| CN | 105300709 A | 2/2016 |
| FR | 2956381 | 8/2011 |
| GB | 1 461 206 | 1/1997 |
| WO | WO 2010/061384 | 5/2010 |
| WO | WO 2015/042169 | 3/2015 |

OTHER PUBLICATIONS

Communication Pursuant to Article 94(3) EPC issued by the European Patent Office in application No. 17 198 979.1 dated May 21, 2019.

Extended European Search Report prepared by the European Patent Office in Application No. EP 17 198 979.1 dated Mar. 21, 2018.

APPLYING A SECOND PREDEFINED LONGITUDINAL FORCE AT A PARTICULAR POINT ON THE CANTILEVERED BEAM, WHEREIN THE PREDEFINED TORQUE IS DETERMINED BASED ON THE SECOND PREDEFINED LONGITUDINAL FORCE AND A DISTANCE BETWEEN THE PARTICULAR POINT ON THE CANTILEVERED BEAM AND A CENTER OF THE SHAFT OF THE REPLICATED NOSE LANDING GEAR ⸺ 1512

TRAILER-MOUNTED MOCK LANDING GEAR

CROSS REFERENCE TO RELATED APPLICATION

The present application is a divisional of U.S. patent application Ser. No. 16/359,477, filed on Mar. 20, 2019, and issued as U.S. Pat. No. 11,260,708, which is a divisional of U.S. patent application Ser. No. 15/367,981, filed on Dec. 2, 2016, and issued as U.S. Pat. No. 10,279,637, the entire contents of all of which are herein incorporated by reference as if fully set forth in this description.

FIELD

The present disclosure relates generally to a trailer-mounted mock landing gear.

BACKGROUND

An aircraft is typically towed using a tow vehicle to move the aircraft at airports or maintenance facilities, or on a manufacturing floor during manufacturing of the aircraft. In an example, a tow vehicle may have a tow bar that is coupled to the nose landing gear of the aircraft to enable the tow vehicle to move and maneuver the aircraft. The tow bar may operate as a mechanical fuse. In other words, the tow bar would break if the force or torque on the tow bar, and thus on the aircraft, exceeds a threshold so as to preclude damage to nose landing gear of the aircraft.

Recently, there has been a trend to replace towing vehicles having tow bars with tow bar-less tow vehicles (TLTVs) that use a sensor array in lieu of a mechanical fuse to prevent damage to the nose landing gear of aircraft. A TLTV may have a controller that monitors or receives, from force and torque sensors, information that indicates the force and torque applied to the nose landing gear. If the force or torque exceeds a predetermined threshold force or torque, the controller may stop the TLTV from moving or otherwise stop the TLTV from applying a force or torque to the aircraft (e.g., releases a holding device that engages with the nose landing gear). In this manner, the damage to the nose landing gear may be avoided.

However, if the sensors do not provide accurate measurements, the TLTV might not operate properly, and damage to the nose landing gear might occur. Calibrating the sensors on a periodic basis may facilitate maintaining their accuracy and preclude damage to the nose landing gear.

To accurately calibrate the sensors, it is desirable to have the sensors operate in a similar environment to the actual environment in which the TLTV operates. In other words, to accurately calibrate the sensors, it is desirable to have the TLTV engaged with an aircraft to simulate realistic loads that the sensor would experience during actual operation.

However, calibrating possibly inaccurate sensor using a real aircraft may result in damage to the aircraft, which could be costly to repair. Further, using an aircraft for testing and calibration might result in flight delays if the aircraft is in operation, or may result in manufacturing delay if the aircraft is in the process of being manufactured.

Therefore, it is desirable to have an apparatus and system that can accurately mock a nose landing gear of an aircraft so as to test, calibrate, and certify TLTVs. Such systems and apparatus could also be used to train new operators that will operate the TLTVs without using an expensive aircraft for the training.

SUMMARY

The present disclosure describes examples that relate to a trailer-mounted mock landing gear.

In one aspect, the present disclosure describes an apparatus configured to couple to a trailer and a tow vehicle. The apparatus includes: a frame; one or more clamps mounted to the frame and configured to couple the frame to an underplate of the trailer; and a shaft having a first end rotatably coupled to the frame and a second end configured to couple to at least one replicated element of a towed vehicle. The at least one replicated element is configured to engage the tow vehicle.

In another aspect, the present disclosure describes a system. The system includes a trailer; a frame mounted to an underplate of the trailer; and a shaft having a first end rotatably coupled to the frame and a second end configured to couple to at least one replicated element of a towed vehicle. The at least one replicated element is configured to engage a tow vehicle.

In still another aspect, the present disclosure describes a method for calibrating a force sensor and a torque sensor of a tow vehicle. The method includes: (i) engaging a holding device of the tow vehicle with at least one replicated element of a towed vehicle, wherein the at least one replicated element is coupled to a shaft having a first end rotatably coupled to a frame that is attached to an underplate of a lowboy trailer and a second end configured to couple to the at least one replicated element; (ii) applying a predefined longitudinal force to a torque-neutral point on the shaft such that the predefined longitudinal force is applied to the shaft without applying a torque thereto; (iii) determining, by a computing device, a reading of the force sensor of the tow vehicle; (iv) applying a predefined torque on the shaft; (v) determining, by the computing device, a reading of the torque sensor of the tow vehicle; (vi) calibrating, by the computing device, the force sensor based on a comparison of the reading of the force sensor and the predefined longitudinal force, and the torque sensor based on a comparison of the reading of the torque sensor and the predefined torque.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

The following detailed description describes various features and functions of the disclosed systems and methods with reference to the accompanying figures. The illustrative system and method examples described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure describes an aircraft tow vehicle, an aircraft, and a replicated nose landing gear as examples for illustration. It should be understood that the apparatuses, systems, and methods described herein could be used with any type of tow vehicles and replicated elements of any type of towed vehicles.

Within examples, an apparatus, system, and methods related to a trailer-mounted mock landing gear are disclosed. An aircraft is typically towed using a tow vehicle to move the aircraft at airports or maintenance facilities, or on a manufacturing floor during manufacturing of the aircraft. In an example, a tow vehicle may have a tow bar that is coupled to the nose landing gear of the aircraft to enable the tow vehicle to move and maneuver the aircraft.

Figure 1:
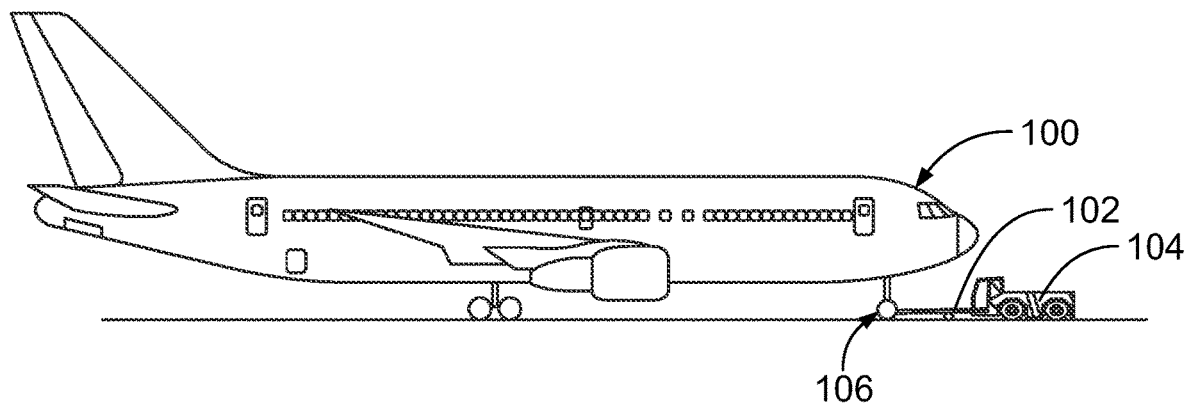
FIG. 1 illustrates towing an aircraft using a tow bar, in accordance with an example implementation.

FIG. 1 illustrates towing an aircraft 100 using a tow bar 102, in accordance with an example implementation. A tow vehicle 104 is used to tow the aircraft 100 by coupling the tow bar 102 to a nose landing gear 106 of the aircraft 100. The tow vehicle 104 can then tow the aircraft 100 by pushing, pulling, and steering the aircraft 100 to a particular location.

The tow bar 102 may operate as a mechanical fuse. In other words, the tow bar 102 may operates as a restraint device that prevents relative movements between the aircraft 100 and the tow vehicle 104 until the force or torque applied through the tow bar 102 reaches a threshold force or torque. The tow bar 102 may include a sacrificial element that breaks upon exceeding such threshold force or torque, thus permitting relative motion between the aircraft 100 and the tow vehicle 104. In this manner, damage to the nose landing gear 106, which might occur if the threshold force or torque is exceeded, can be avoided.

Recently, there has been a trend to replace towing vehicles with tow bars with TLTVs. TLTVs do not include tow bars and improve safety, space, and reduces potential unintended effects on aircrafts. In some examples, TLTVs could be driven by human drivers, and in other examples, they could be remotely controlled using a wireless communication between a remote control device and a controller on the TLTV. TLTVs could be electrically-powered by a battery as opposed to a diesel-powered tow vehicle, which have emissions that might not be suitable for indoor environments (e.g., manufacturing facilities). Additionally, within a factory environment in which an aircraft is positioned in a nose-to-tail configuration, there might not be enough space to fit a conventional tow vehicle using a tow bar. Further, TLTVs could be easier to maneuver, take up less space, and training on their use may take less time compared to tow vehicles that use tow bars.

Figure 2:
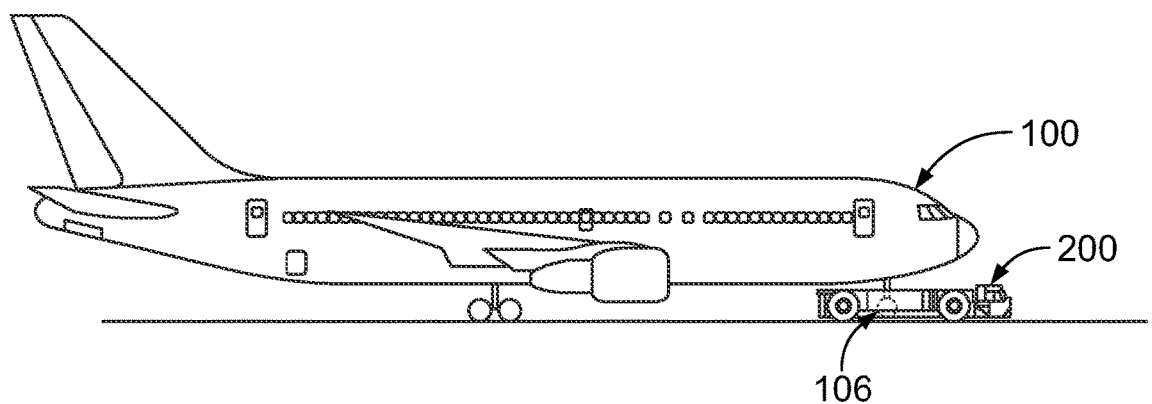
FIG. 2 illustrates a towbar-less tow vehicle (TLTV) towing an aircraft, in accordance with an example implementation.
Figure 3:
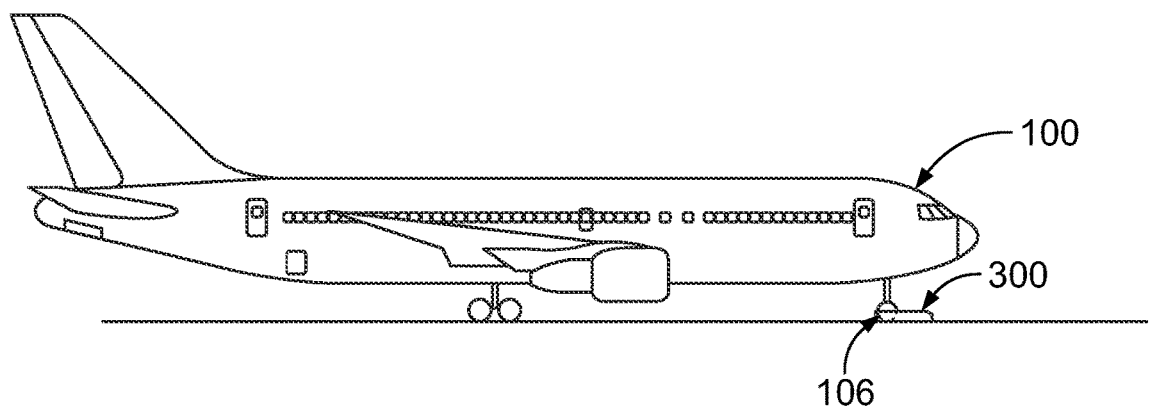
FIG. 3 illustrates a remotely-controlled TLTV, in accordance with an example implementation.

FIG. 2 illustrates a TLTV 200 towing the aircraft 100, and FIG. 3 illustrates a remotely-controlled TLTV 300, in accordance with an example implementation. As shown in FIGS. 2-3, the TLTVs 200 and 300 does not include a tow bar, but they couple to the nose landing gear 106 via a holding device.

Figure 4:
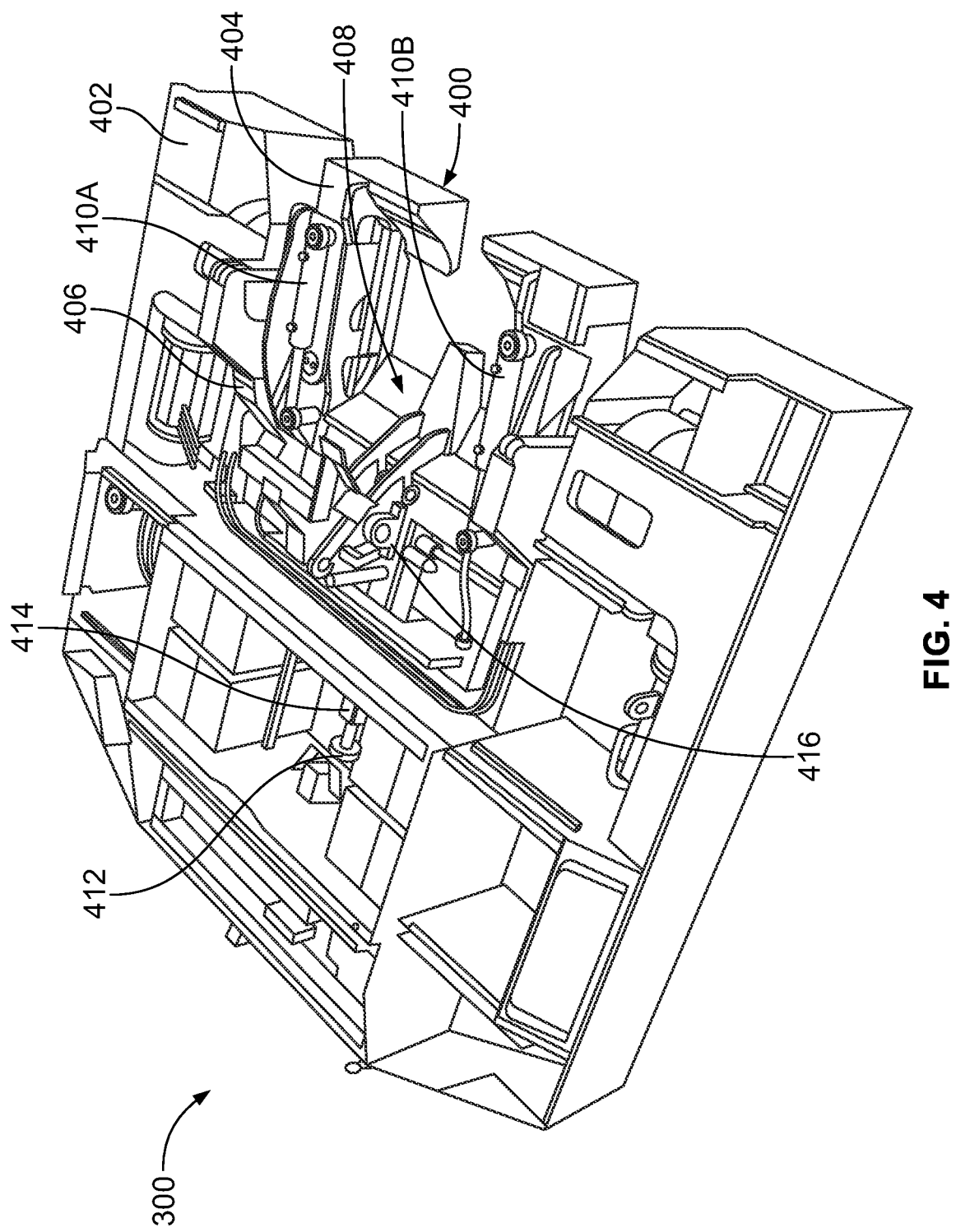
FIG. 4 illustrates a perspective view of a remotely-controlled TLTV having a holding device, in accordance with an example implementation.

FIG. 4 illustrates a perspective view of the remotely-controlled TLTV 300 having a holding device 400, in accordance with an example implementation. Although the remotely-controlled TLTV 300 is used hereinafter, it should be understood that the TLTV 200 could be used instead.

The holding device 400 is configured to receive and engage the nose landing gear 106 of the aircraft 100 to enable the TLTV 300 to tow the aircraft 100 at a particular speed. The TLTV 300 includes a chassis 402 that encloses the holding device 400 configured to receive the nose landing gear 106. The TLTV 300 also includes a propulsion arrangement configured to move the TLTV 300 in a direction along a trajectory.

The holding device 400 is a rotatable aircraft nose landing gear support assembly that is pivotably and rotatably mounted to the chassis 402. The holding device 400 may be coupled to the chassis 402 in a manner that allows a limited amount of freedom of movement thereof relative to the chassis 402. Particularly, the holding device 400 may be coupled to the chassis 402 in a manner that allows for relatively low friction rotatability and tiltability relative to the chassis 402. The holding device 400 may be coupled to the chassis 402 via an energy absorber assembly which may comprise a plurality of energy absorbing pistons to mitigate any momentum shocks during aircraft towing.

A frame 404 of the holding device 400 may be configured to align the nose landing gear 106 with the holding device 400. The holding device 400 may include a clamp assembly 406 configured to clamp wheels of the nose landing gear 106 onto the frame 404 of the holding device 400.

The holding device 400 may also include a wheel ramp 408 mounted thereon. Piston assemblies 410A and 410B may be provided for pushing and lifting the nose landing gear 106 and positioning the wheels of the nose landing gear 106 onto the holding device 400.

In examples, the frame 404 could be isolated from the chassis 402 for a few reasons. The frame 404 is configured to "open" its jaws in order to reach around wheels of the nose landing gear 106 when attaching or detaching. The frame 404 may also be configured to pick up the wheels when starting a move of the aircraft 100 and put them down at the conclusion of the move via hydraulic actuators (e.g., the piston assemblies 410A and 410B). Further, the frame 404 may be sprung and damped in order to reduce shock loading to the nose landing gear 106.

The holding device 400 may further include a push-pull force load cell or force sensor 412 mounted onto a forward facing bar 414 to sense longitudinal push-pull forces applied to the nose landing gear 106. These longitudinal push-pull forces may be due to differences in acceleration, deceleration, and/or speed of the TLTV 300 relative to acceleration, deceleration, and/or speed of the aircraft 100 being towed.

The holding device 400 may also include a torque load cell or torque sensor 416. The torque sensor 416 is configured to measure the torque that the nose landing gear 106 experiences as the TLTV 300 moves the aircraft 100.

In some situations, as the TLTV 300 tows the aircraft 100, the holding device 400 may apply a force or torque on the nose landing gear 106 that exceeds a threshold force or torque, and may thus cause damage to the aircraft 100. For instance, if the TLTV 300 is pulling the aircraft 100 through a ramp, then the pulling force applied by the holding device 400 on the nose landing gear 106 may increase compared to pulling the aircraft 100 on a level surface.

In another example, the TLTV 300 may be maneuvering or steering the aircraft 100 through a tight steering radius, which may cause the nose landing gear 106 to bind up, causing an increasing in the torque that the holding device 400 applies to the nose landing gear 106. In another example, the TLTV 300 may be pulling or pushing the aircraft 100, and then the aircraft 100 or the TLTV 300 bumps into an object causing the aircraft 100 to stop or slow down suddenly. The momentum of the aircraft 100 may cause a sudden increase in the push-pull force or the torque at the interface between the holding device 400 and the nose landing gear 106. Therefore, under various static and/or dynamic loading situations, the force and torques applied by the holding device 400 on the nose landing gear 106 may increase beyond a threshold force or torque.

The TLTV 300 does not have a tow bar 102 that operates as a mechanical fuse to prevent damage when one of these loading situations is encountered. Rather, the TLTV 300 may use force and torque sensors in lieu of a mechanical fuse to implement a push-pull load protection system and a torsion protection system to prevent damage to the nose landing gear 106 of the aircraft 100.

Figure 5:
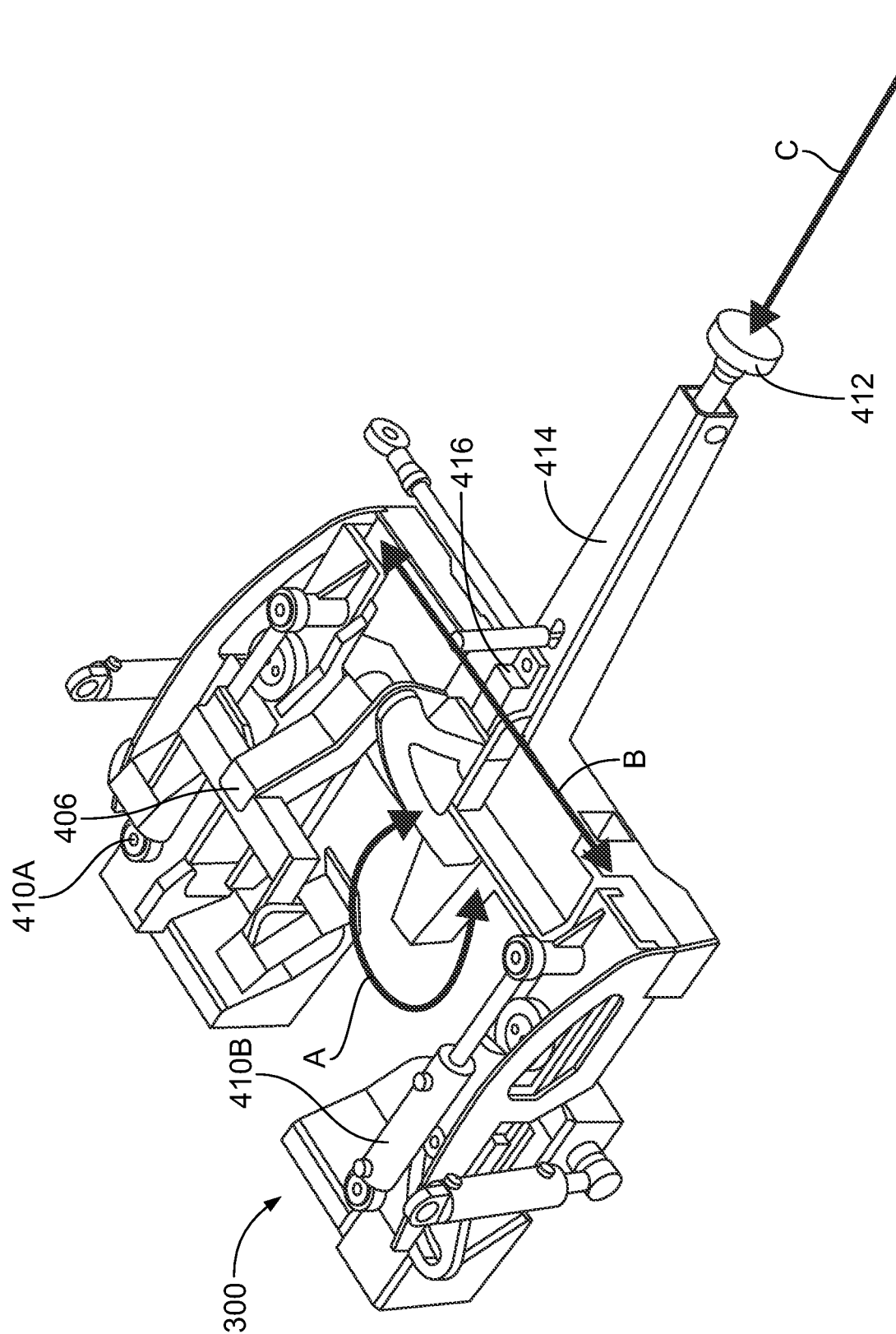
FIG. 5 illustrates a perspective view of the holding device shown in FIG. 4, in accordance with an example implementation.

FIG. 5 illustrates a perspective view of the holding device 400, in accordance with an example implementation. As illustrated in FIG. 5, rotation at point A of the holding device 400, where the nose landing gear 106 is coupled, is precluded by forces B, which are measured by the torque sensor 416. Similarly, the force sensor 412 measures the longitudinal push- and pull-forces C that the nose landing gear 106 experiences as the TLTV 300 moves the aircraft 100.

The TLTV 300 may have a controller that monitors or receives, from the torque sensor 416 and the force sensor 412, information that indicates the push-pull force C and the torque applied to the nose landing gear 106. If the force or torque exceeds a predetermined threshold force or torque, the controller may stop the TLTV 300 from moving or otherwise stop the TLTV 300 from applying a force or torque to the aircraft 100. For example, the controller may release the nose landing gear 106 from the holding device 400 to protect the nose landing gear 106.

As an example, for illustration, the vertical load that is applied by the aircraft 100 to the nose landing gear 106 may be about 10% of the weight of the aircraft 100. Assuming that the aircraft 100 weighs 140000 pounds (lbs), then the nose landing gear 106 may experience a 14000 lbs-force vertical load. In an example, the threshold push-pull force may be set at 50% of this vertical load, i.e., 7000 lbs-force, so as to take into consideration and accommodate sudden increases in force due to dynamic (e.g., momentum) changes. If the controller of the TLTV 300 receives sensor information from the force sensor 412 indicating that the force increased beyond 7000 lbs-force, the controller may send a command to stop the TLTV 300.

Similarly, If the controller of the TLTV 300 receives sensor information from the torque sensor 416 indicating that the torque increased beyond a threshold allowable torque (e.g., 49200 inches-lbs), the controller may send a command to stop the TLTV 300. In this manner, the damage to the nose landing gear 106 could be avoided. The weight and threshold values mentioned above are used herein as examples for illustration only. Weight and threshold values may vary based on the type of aircraft.

Preventing unintended effects on the aircraft 100 may depend on the accuracy of measurements obtained by the torque sensor 416 and the force sensor 412. For instance, sensors may drift over time causing the TLTV 300 to not operate correctly and may result in unintended effects on the aircraft 100. In an example, the sensors 412 and 416 may drift such that the measured value for force or torque sent to the controller is less than the actual force or torque. In this example, the controller might not stop the TLTV 300 when the actual force or torque exceeds a particular threshold. As a result, a larger-than-allowed force or torque may be applied to the nose landing gear 106 causing damage thereto.

In another example, the sensors 412 and 416 may drift such that the measured value for the force or torque sent to the controller is greater than the actual force or torque. In this example, the controller may release, or repeatedly release, the holding device 400 while the actual force or torque did not exceed the particular threshold, thus unduly slowing down the towing operation of the aircraft 100.

Therefore, calibrating the torque sensor 416 and the force sensor 412 periodically may facilitate maintaining their accuracy and proper operation of the TLTV 300. The sensor 412 and 416 do not exist in isolation, but are part of an assembly of the holding device 400. Therefore, to accurately calibrate the sensors, it is desirable to have the sensors operate in a similar environment to the actual environment in which the TLTV operates. In other words, to accurately calibrate the sensors, it is desirable to have the TLTV engaged with the aircraft 100 to simulate the load path that the sensor 412 and 416 would experience during actual operation of the TLTV 300. This way, the loads experienced by the sensors 412 and 416 during calibration correlate with actual loads experienced thereby during actual operation.

However, calibrating possibly inaccurate sensors using the aircraft 100 may violate recommended manufacturer practice and may also result in damage to the aircraft 100, which could be costly to repair. Further, using the aircraft 100 for testing and calibration might result in flight delays if the aircraft 100 is in operation, or may result in manufacturing delay if the aircraft 100 is in the process of being manufactured.

Disclosed herein are an apparatus, a system, and a method that relate to trailer-mounted mock nose landing gear so as to test, calibrate, and certify TLTVs. Such a system and apparatus could also be used to train new operators that will operate the TLTV 300 without using an expensive aircraft for the training. Particularly, the present disclosure describes an apparatus and system that converts a trailer into an accurate approximation of an aircraft nose landing gear and facilitates sensor calibration. The apparatus and system create a low-cost, accurate, portable, and easy-to-use equipment for the certification/calibration of the TLTV 300 as well as training new operators on using the TLTV 300.

Figure 6:
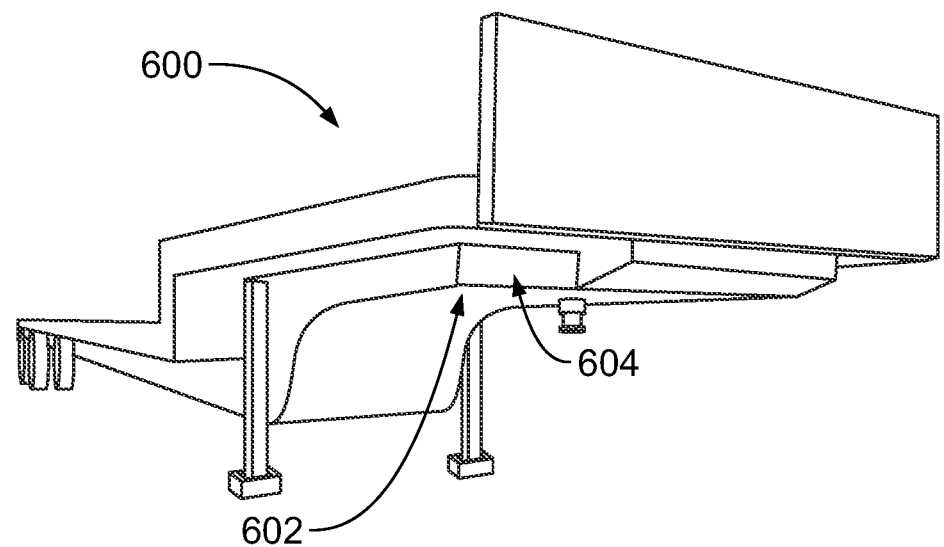
FIG. 6 illustrates a trailer, in accordance with an example implementation.

FIG. 6 illustrates a trailer 600, in accordance with an example implementation. The trailer 600 is depicted as a lowboy trailer. However, other types of trailers could be used. The trailer 600 has a raised deck portion 602 and an underplate 604 underneath the raised deck portion 602.

Figure 7:
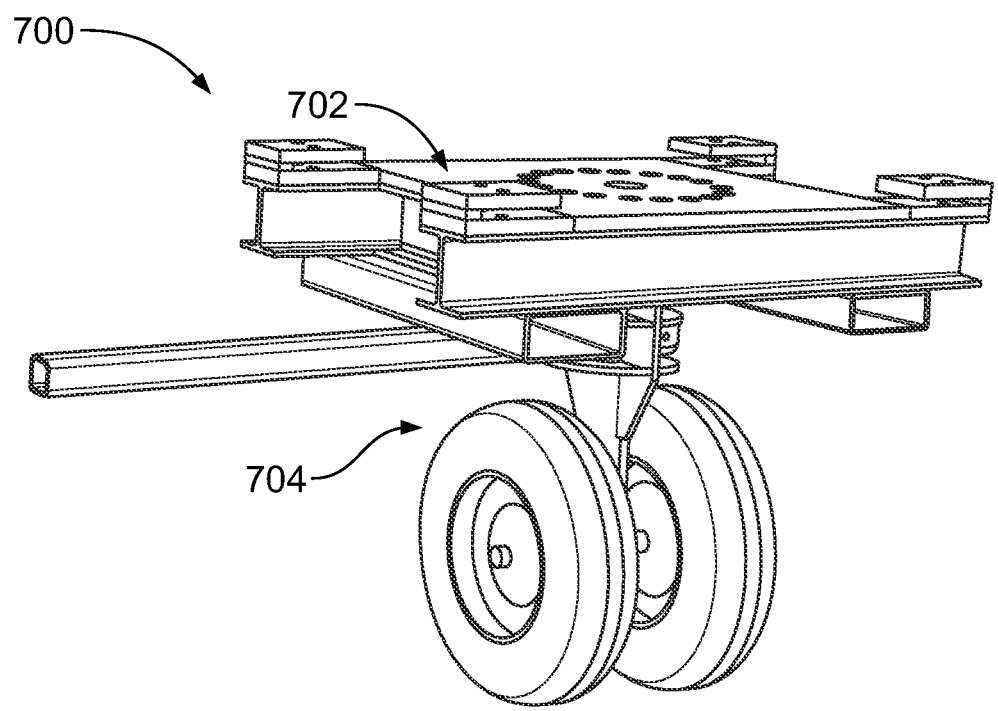
FIG. 7 illustrates an apparatus configured to couple to a trailer and a TLTV, in accordance with an example implementation.

FIG. 7 illustrates an apparatus 700 configured to couple to the trailer 600 and the TLTV 300, in accordance with an example implementation. The apparatus 700 includes a frame 702 and a replicated nose landing gear 704. The designation "replicated" is used herein to indicate that the replicated nose landing gear 704 might not be an actual nose landing gear, but could be any mechanism or structure that simulates a nose landing gear. For example, the replicated nose landing gear 704 might not include aircraft wheels, but may include other types of wheels and may include fewer or greater number of wheels compared to a real nose landing gear. In another example, the replicated nose landing gear 704 may include a circular or semi-circular concrete or metal block covered with rubber. Any other mechanism or structure that is configured to transmit a reaction longitudinal force and torque similar to those generated by a nose landing gear of an aircraft on the holding device 400 could be used.

The frame 702 is configured to couple to the underplate 604 disposed underneath the raised deck portion 602 of the trailer 600 so as to couple the apparatus 700 to the trailer 600. Further, the replicated nose landing gear 704 is configured to engage the holding device 400 of the TLTV 300.

Figure 8:
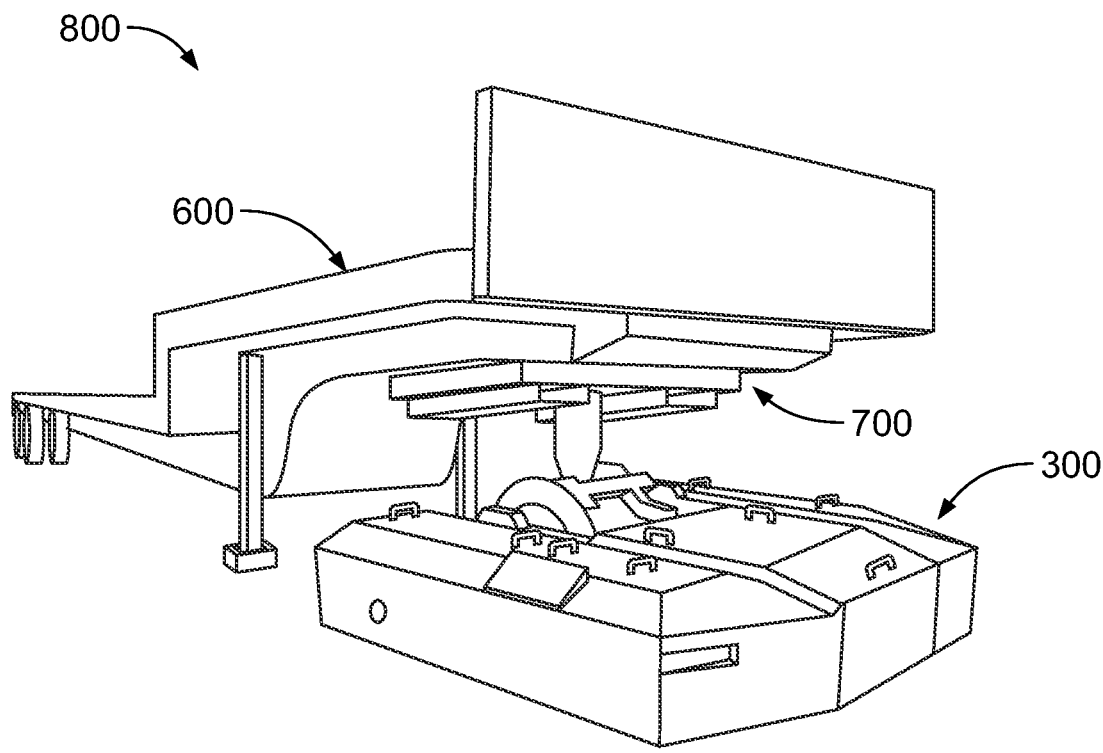
FIG. 8 illustrates a system having the apparatus shown in FIG. 7 coupled to a trailer and engaging a TLTV, in accordance with an example implementation.

FIG. 8 illustrates a system 800 having the apparatus 700 coupled to the trailer 600 and engaging the TLTV 300, in accordance with an example implementation. In an example, the wheelbase of the trailer 600 may be similar to the wheelbase of an aircraft. In other words, the distance between the rear wheels of the trailer 600 and wheels of the replicated nose landing gear 704 may be similar to the distance between the rear wheels and the front wheels of an aircraft so as to accurately mock an aircraft with a landing gear.

Further, weight could be added to the deck of the trailer 600 so as to cause a downward weight or force on the replicated nose landing gear 704 that is similar to the actual weight that a nose landing gear of an aircraft experiences. For instance, metal or concrete blocks could be added to the raised deck portion 602 of the trailer 600 (see FIG. 17) to apply a downward weight thereto so as to apply a corresponding downward weight on the replicated nose landing gear 704. The weight of the blocks could be such that the downward weight on the replicated nose landing gear 704 is substantially equal to (e.g., within a threshold value from) a particular percentage (e.g., 10%) of a weight of an aircraft. In this manner, the apparatus 700 converts the trailer 600 into an accurate approximation of an aircraft with a landing gear that could be used for testing, certification, calibration, and training.

Figure 9:
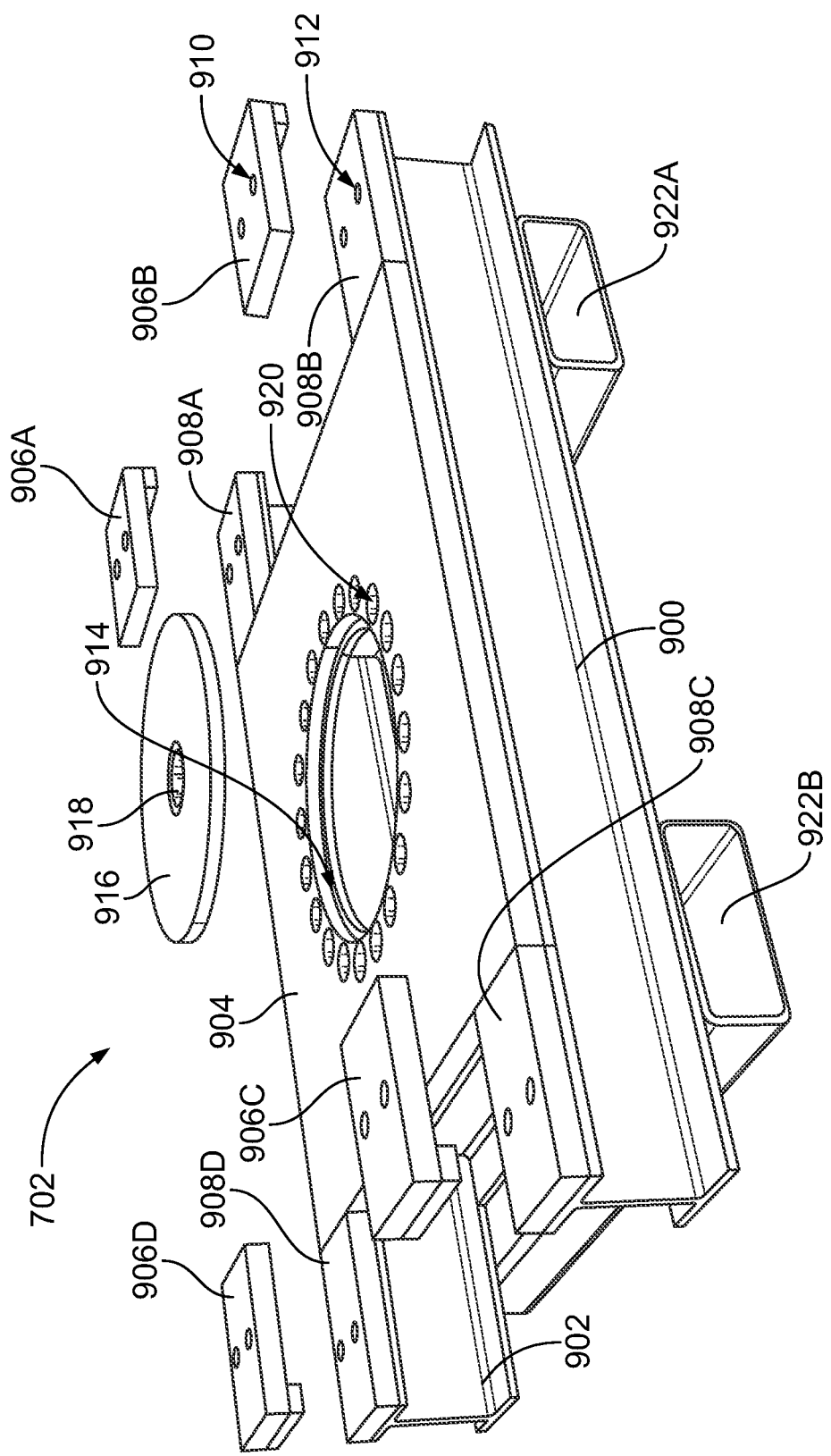
FIG. 9 illustrates an exploded perspective view of a frame of the apparatus shown in FIG. 7, in accordance with an example implementation.

FIGS. 9-14 illustrate example components and configurations of the apparatus 700, in accordance with an example implementation. Particularly, FIG. 9 illustrates an exploded perspective view of the frame 702 of the apparatus 700, in accordance with an example implementation. The frame 702 may include a first I-beam 900. The frame 702 may also include a second I-beam 902. The I-beams 900 and 902 may be configured as parallel beams. The frame 702 may further include a top plate 904 coupled to the first I-beam 900 and the second I-beam 902.

The frame 702 may include one more clamps such as clamps 906A, 906B, 906C, and 906D. In an example, the clamps 906A-D may be coupled to the I-beams 900 and 902 directly or via corresponding plates 908A, 908B, 908C, and 908D, respectively. In this example, the plates 908A-D or the I-beams 900 and 902 may include slots that allow for adjustments and alignment of the clamps 906A-D. In another example, the clamps 906A-D could be mounted to the top plate 904.

The clamps 906A-D may include holes, such as hole 910 in the clamp 906B. These holes are configured to receive bolts or other types of fasteners to couple the clamps 906A-D to the underplate 604 of the trailer 600. This way, the frame 702 is coupled to the trailer 600. The plates 908A-D may also include holes such as hole 912 in the plate 908B. A fasteners that couples the clamps 906A-D to the underplate 604 of the trailer 600 by passing through the hole 910 may also pass through the hole 912 to further secure the frame 702 to the trailer 600. Thus, as an example as shown in FIG. 9, a total of eight fasteners (e.g., bolts) with washers and nuts could be placed through hole(s) 910 and 912 to secure the frame 702 to the underplate 604 of the trailer 600.

The top plate 904 may include a stepped surface 914 configured to receive a removable lid or removable disk 916. When the disk 916 sits on or is received at the stepped surface 914, a top surface of the disk 916 is below or is flush with a top surface of the top plate 904. In this configuration, when the frame 702 is coupled to the underplate 604 of the trailer 600, the top surface of the disk 916 and the top surface of the top plate 904 mate with a bottom surface of the underplate 604.

The disk 916 includes a hole 918 that is configured to receive a king pin of the trailer 600 as described below. Further, the top plate 904 includes a plurality of counterbore holes, such as counterbore hole 920, which form a radial array as depicted in FIG. 9. A counterbore hole includes a cylindrical flat-bottomed hole that enlarges another coaxial hole. These counterbore holes are configured to receive respective fasteners, such that a socket head cap screw of a fastener sits flush with or below the level of the top surface of the top plate 904. The fasteners that sit in the radial array of counter bore holes, such as the counterbore hole 920, are used to couple an outer race of a slew bearing to the frame 702 as described below.

The frame 702 may also include forklift pockets 922A and 922B coupled underneath the I-beams 900 and 902. The forklift pockets 922A-B facilitate handling and movement of the frame 702 by way of a forklift.

The configuration and components of the frame 702 are used herein as examples for illustration only. Other configurations and components could be used to couple a frame to the trailer 600. For instance, fewer or more I-beams could be used. Instead of clamps, bolts or other types of fasteners could be used to directly couple the frame 702 to the trailer. Other components and configurations are possible.

Figure 10:
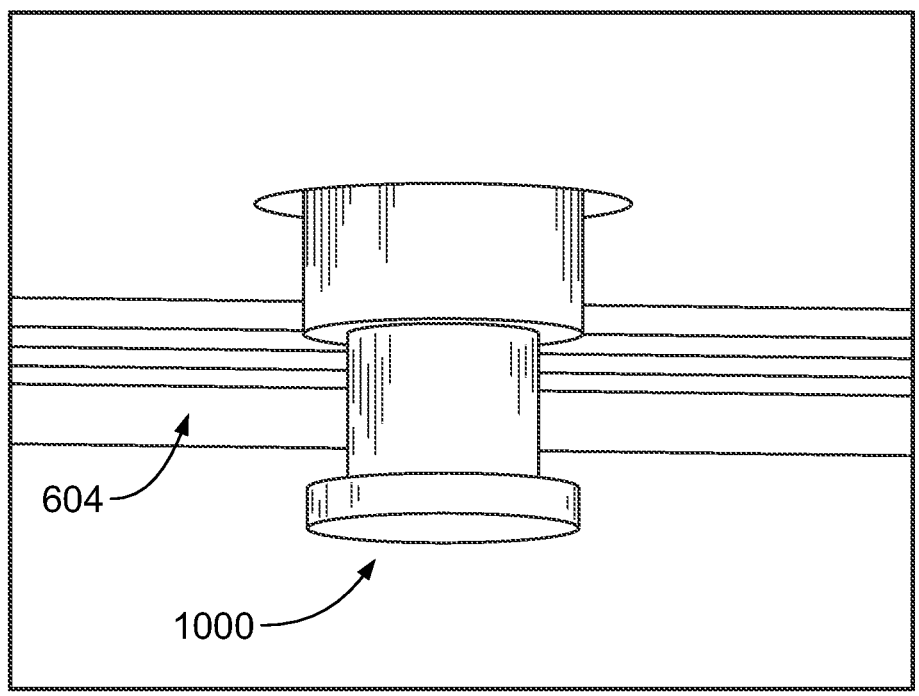
FIG. 10 illustrates a king pin of a trailer, in accordance with an example implementation.

FIG. 10 illustrates a king pin 1000 of the trailer 600, in accordance with an example implementation. As shown, the king pin 1000 protrudes downward from the underplate 604 of the trailer 600. An operator of a forklift can insert the two forks of the forklift in the pockets 922A-B of the apparatus 700 to move the frame 702 and to align the hole 918 in the disk 916 with the king pin 1000 of the trailer 600 in preparation for coupling the clamps 906A-D to the underplate 604 of the trailer 600 by way of fasteners are described above. In this configuration, the king pin 1000 may be configured to withstand a certain level of shear loading while the clamps 906A-D rigidly couple the frame 702 to underplate 604 of the trailer 600. The clamps 906A-D may absorb vertical loads to alleviate any bending moment being imposed on the disk 916 and the king pin 1000.

Figure 11:
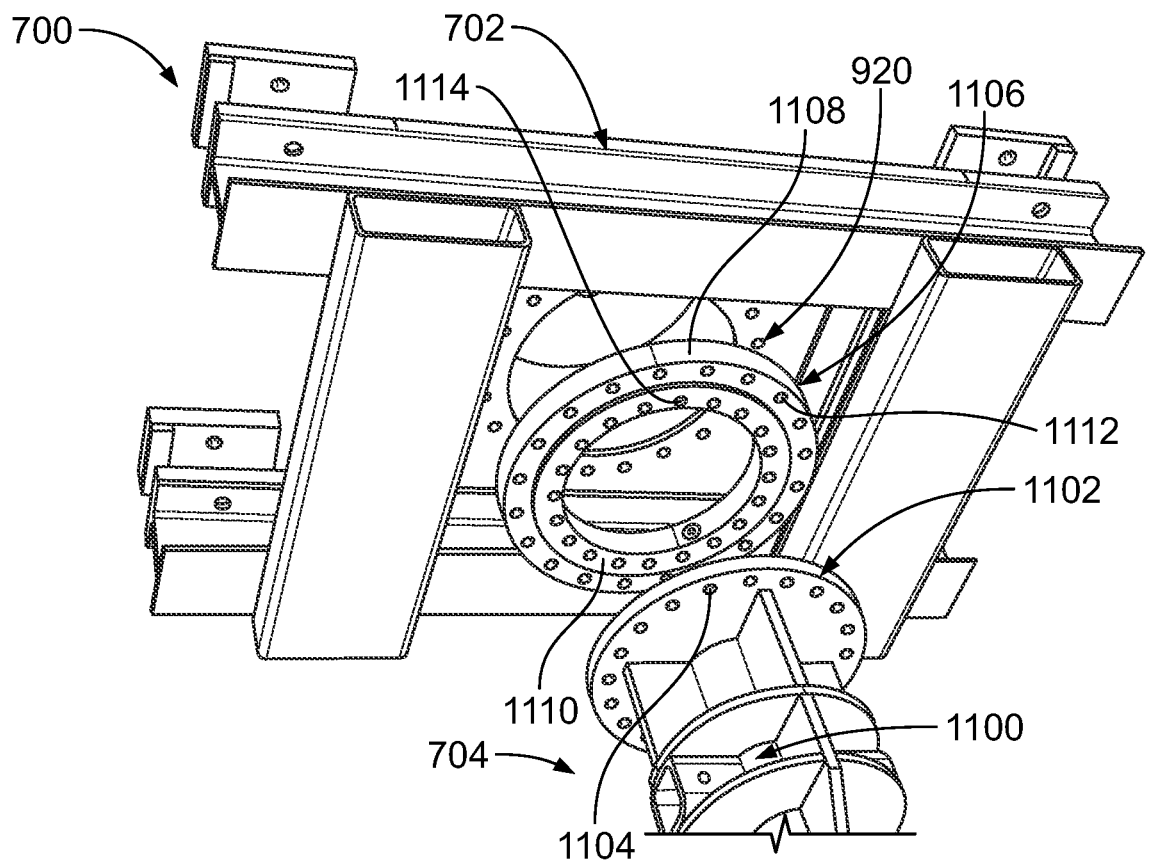
FIG. 11 illustrates an exploded partial bottom perspective view of the apparatus shown in FIG. 7, in accordance with an example implementation.

FIG. 11 illustrates an exploded partial bottom perspective view of the apparatus 700, in accordance with an example implementation. As shown, the replicated nose landing gear 704 may include a shaft 1100. The shaft 1100 has a first end, where a plate or disk 1102 is coupled thereto, and the disk 1102 includes a plurality of through holes such as hole 1104. A second end opposite the first end of the first shaft is coupled to the replicated aircraft wheels as described below.

The apparatus 700 includes a slew bearing 1106 that has an outer race 1108 and an inner race 1110, wherein the inner race 1110 is rotatable within the outer race 1108. The outer race 1108 includes a plurality of holes such as hole 1112 that correspond to the counterbore holes, e.g., the counterbore hole 920, in the top plate 904 of the frame 702. The inner race 1110 includes a plurality of holes, such as hole 1114, that correspond to the plurality of holes of the disk 1102 (e.g., the hole 1104).

Thus, the shaft 1100 of the replicated nose landing gear 704 could be coupled to the inner race 1110 by way of the disk 1102 via, for example, bolts disposed in the holes of the disk 1102 (e.g., the hole 1104) and the holes of the inner race 1110 (e.g., the hole 1114). Also, the outer race 1108 could be coupled to the frame 702 by, for example, bolts disposed in the holes of the outer race 1108 (e.g., the hole 1112) and the counterbore holes of the frame 702 (e.g., the counterbore hole 920). In this manner, the shaft 1100, and thus the entire replicated nose landing gear 704, are rotatable with the inner race 1110 relative to the frame 702 to which the outer race 1108 is fixedly coupled.

The bolts that couple the outer race 1108 to the frame 702 and the bolts that couple the disk 1102 to the inner race 1110 may be re-torqued on a periodic basis for maintenance purposes. To re-torque the bolts, the disk 916, which operates as a removable lid, could be removed to facilitate reaching the bolts of the outer race 1108 and the inner race 1110 with a wrench to re-torque the bolts to a standard level.

Figure 12:
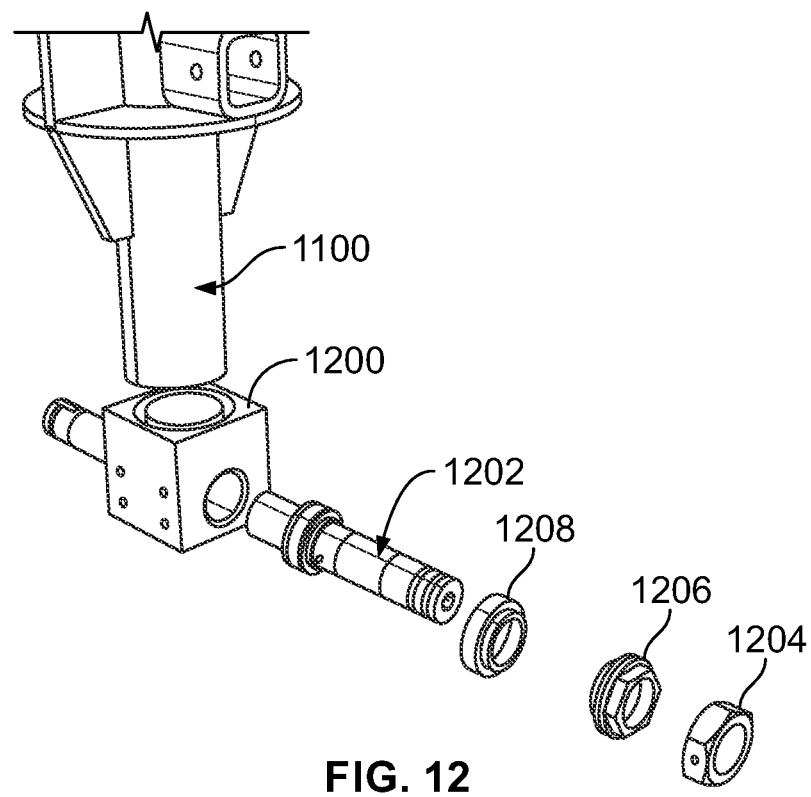
FIG. 12 illustrates a shaft of a replicated nose landing gear rotatably coupled to the frame shown in FIG. 9, in accordance with an example implementation.

FIG. 12 illustrates the shaft 1100 of the replicated nose landing gear 704 rotatably coupled to the frame 702, in accordance with an example implementation. As mentioned above, the disk 1102 is coupled to the first end of the shaft 1100. In an example, a block 1200 may be mounted to the second end of the shaft 1100, and the block 1200 may be configured to receive an axle 1202.

FIG. 12 illustrates an exploded view of the axle 1202. Replicated aircraft wheels may be mounted to the axle 1202 and retained by way of a retaining nut 1204. The retaining nut 1204 may include a built-in set screw. In examples, an axle keeper nut 1206 and a wheel bearing spacer 1208 may further facilitate retaining the replicated aircraft wheels to the axle 1202. The axle 1202 could be symmetrical with respect to the block 1200 so as to accommodate two replicated aircraft wheels, e.g., one wheel on each side of the block 1200.

Figure 13:
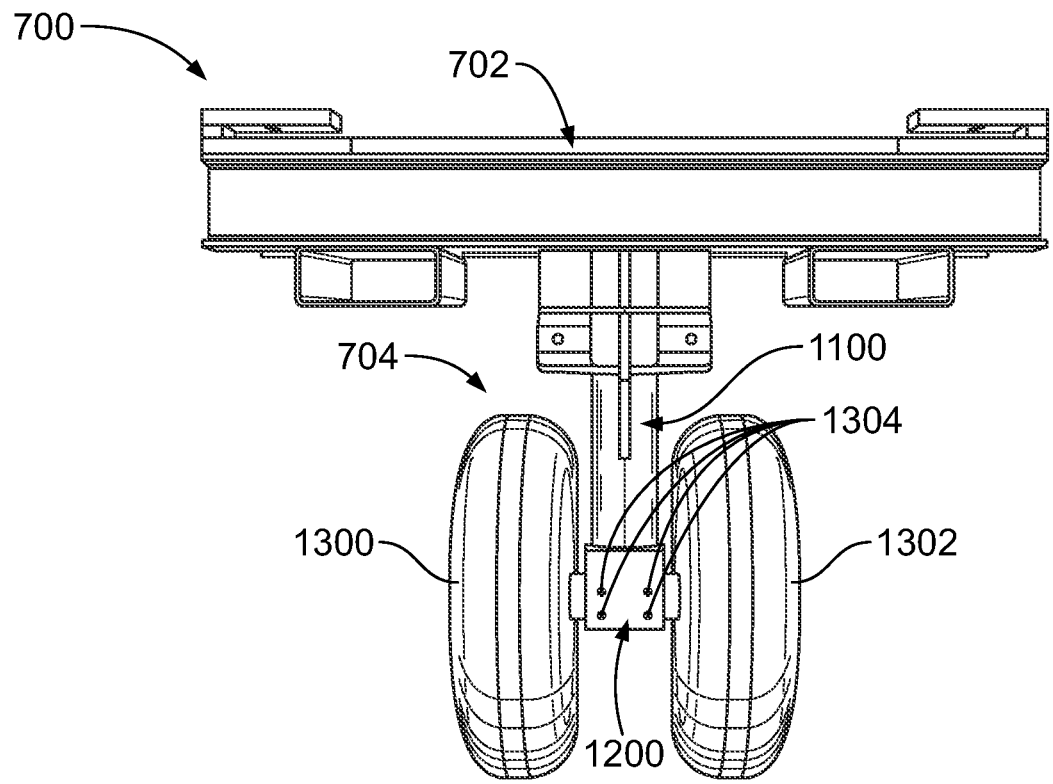
FIG. 13 illustrates a replicated nose landing gear with two replicated aircraft wheels and coupled thereto, in accordance with an example implementation.

FIG. 13 illustrates the replicated nose landing gear 704 with two replicated aircraft wheels 1300 and 1302 coupled thereto, in accordance with an example implementation. Particularly, the wheels 1300 and 1302 are mounted to the axle 1202 described above and shown in FIG. 12. As mentioned above, although the Figures and description above illustrate the replicated nose landing gear 704 resembling an actual nose landing gear of an aircraft, in other examples, the replicated nose landing gear 704 might not resemble an actual nose landing gear. The replicated nose landing gear 704 may include any mechanism or structure to which a longitudinal and torque forces could be applied, and which would interface with the holding device 400 of the TLTV 300 in a similar manner to an actual nose landing gear.

As shown in FIG. 13, the block 1200 at the second end of the shaft 1100 may have a bolt pattern 1304 to facilitate coupling a mount, e.g., a pintle hitch, a lunette ring, etc., to the block 1200. A longitudinal force may then be applied to the mount so as to apply a corresponding longitudinal force on the replicated nose landing gear 704 while the replicated nose landing gear 704 engages the holding device 400. The block 1200 and the bolt pattern 1304 are located at a torque-neutral point such that if a longitudinal force is applied through the mount to the replicated nose landing gear 704, no torque is applied thereto.

Figure 14:
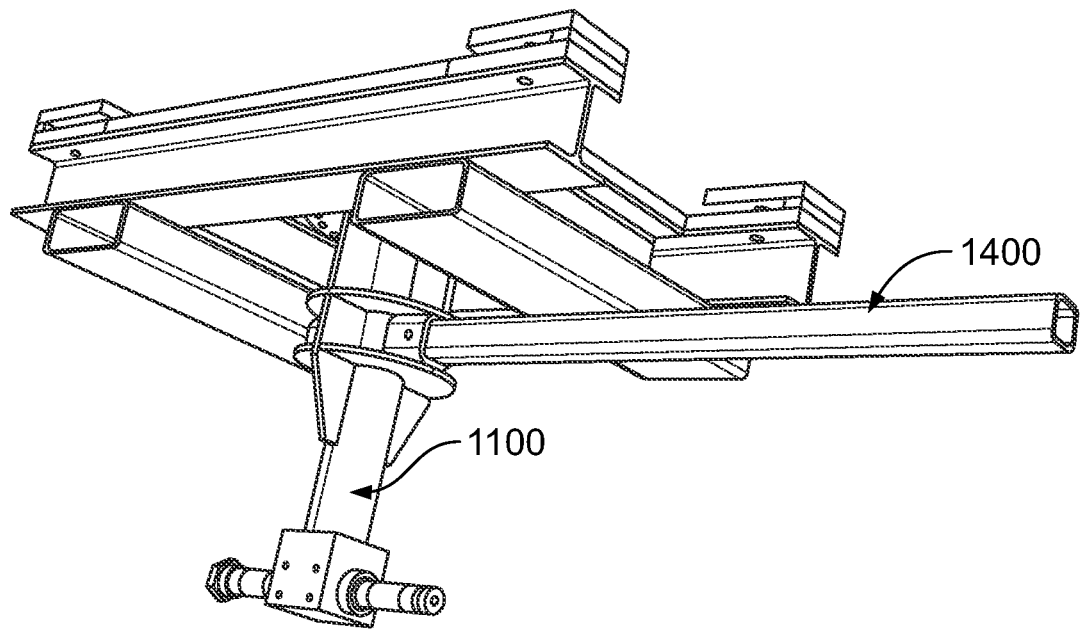
FIG. 14 illustrates a cantilevered bar coupled to the shaft shown in FIG. 12, in accordance with an example implementation.

FIG. 14 illustrates a cantilevered bar 1400 coupled to the shaft 1100, in accordance with an example implementation. In order to apply a torque to the replicated nose landing gear 704, a longitudinal force may be applied to a particular point along the cantilevered bar 1400. This way, the longitudinal force applies a moment on the replicated nose landing gear 704 that is equal to the force multiplied by a distance (i.e., moment arm) between the particular point of application of the force and the center of the shaft 1100.

Thus, by having the bolt pattern 1304 on the block 1200 and the cantilevered bar 1400 a predefined longitudinal force and a predefined torque could be applied to the replicated nose landing gear 704 while the holding device 400 is engaged therewith. Then, the force and torque are transmitted to the sensors 412 and 416 of the holding device 400. A comparison of the predefined force and torque to the measured values of the sensors 412 and 416 may then be used to calibrate the sensors 412 and 416 and certify the TLTV 300.

Figure 15:
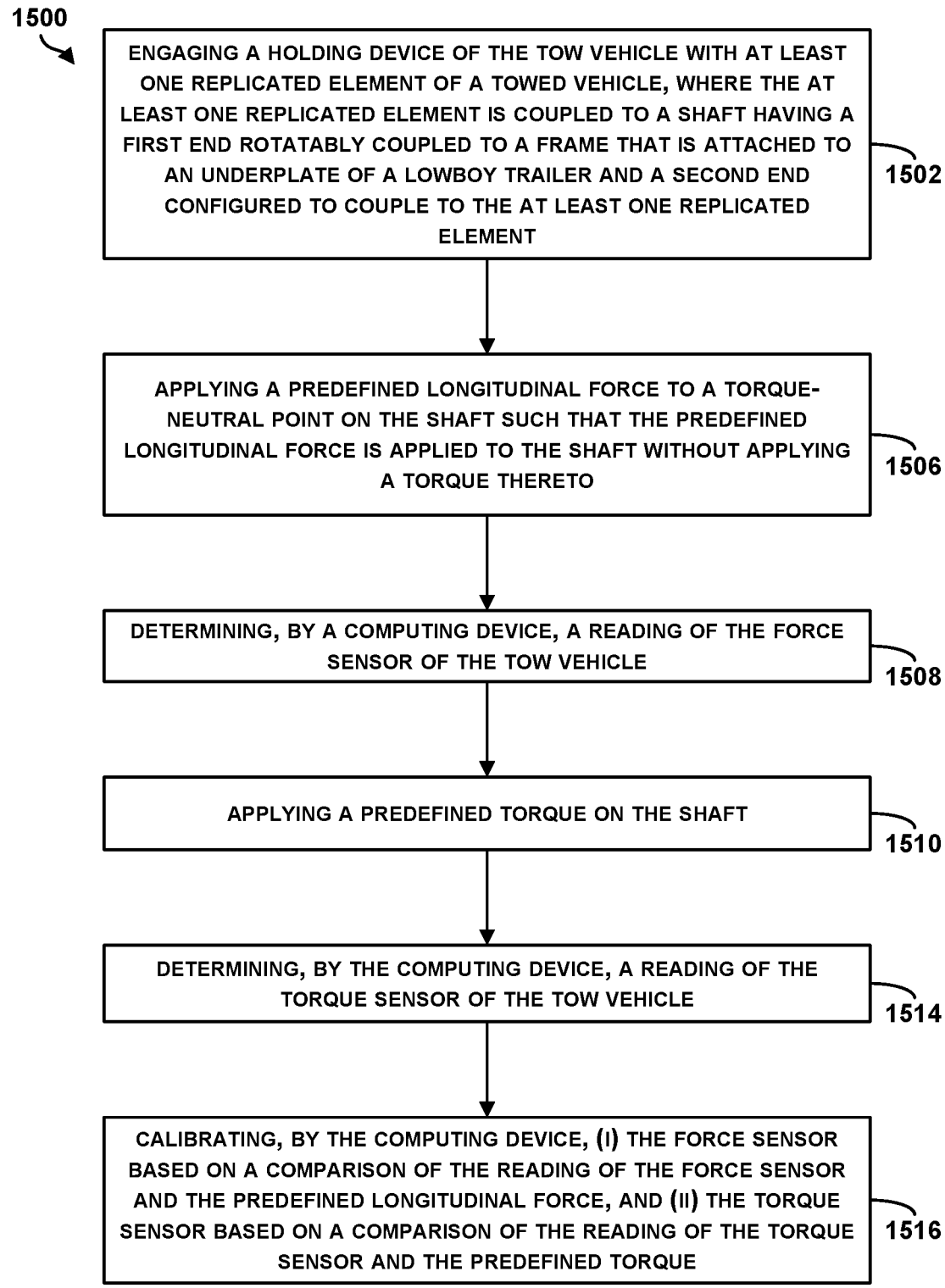
FIG. 15 is a flowchart of a method for calibrating a force sensor and a torque sensor of an aircraft tow vehicle, in accordance with an example implementation.
Figure 16:
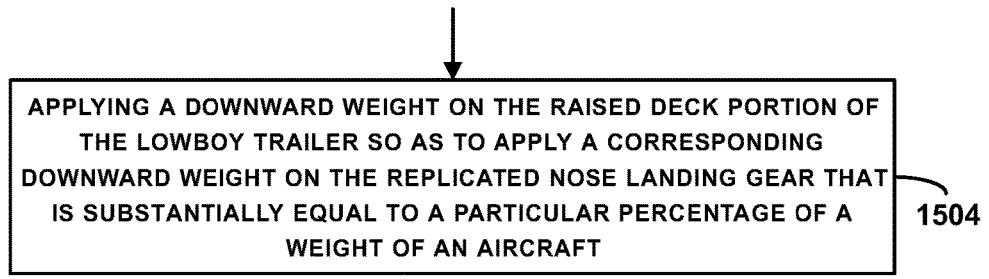
FIG. 16 is a flowchart of a method for use with the method shown in FIG. 15, in accordance with an example implementation.
Figures 18, 19:
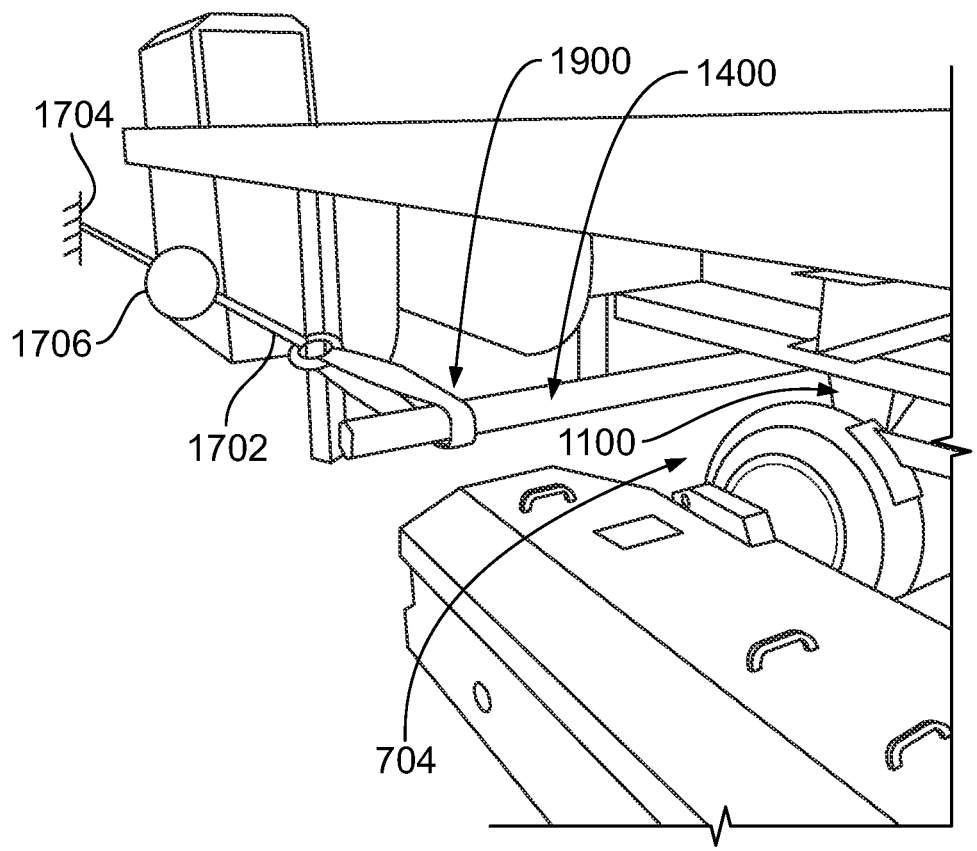
FIG. 18 is a flowchart of a method for use with the method of FIG. 15, in accordance with an example implementation.
FIG. 19 illustrates applying a torque to a replicated nose landing gear, in accordance with an example implementation.

FIG. 15 is a flowchart of a method 1500 for calibrating a force sensor and a torque sensor of an aircraft tow vehicle, in accordance with an example implementation. Further, FIGS. 16 and 18 are flowcharts of methods for use with the method 1500. For instance, the method 1500 could be used to calibrate torque and forces sensors 412 and 416 of the TLTV 300.

The method 1500 may include one or more operations, or actions as illustrated by one or more of blocks 1502-1516. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1500 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1500 and other processes and operations disclosed herein, one or more blocks in FIGS. 15, 16, and 18 may represent circuitry or digital logic that is arranged to perform the specific logical operations in the process.

At block 1502, the method 1500 includes engaging a holding device of the tow vehicle with at least one replicated element of a towed vehicle, where the at least one replicated element is coupled to a shaft having a first end rotatably coupled to a frame that is attached to an underplate of a lowboy trailer and a second end configured to couple to the at least one replicated element. As described above, the apparatus 700 may be coupled to the raised deck portion 602 of the lowboy trailer 600. The TLTV 300 may be driven toward the replicated nose landing gear 704 of the apparatus 700 until the replicated nose landing gear 704 engages the holding device 400.

FIG. 16 is a flowchart of a method for use with the method 1500, in accordance with an example implementation. At block 1504, the method includes applying a downward weight on the raised deck portion of the lowboy trailer so as to apply a corresponding downward weight on the replicated nose landing gear that is substantially equal to a particular percentage of a weight of an aircraft.

Due to discrepancy between the weight of the trailer 600 and the weight of an aircraft, weights could be added to the deck of the trailer 600 to simulate the weight of an actual nose landing gear. For example, test weights could be positioned on the deck of the trailer 600 to deliver 14,000 lbs of vertical load on the replicated nose landing gear 704. In this manner, the combination of the trailer 600 and the apparatus 700 provides an accurate approximation of an actual aircraft and a nose landing gear coupled thereto. The term "substantially equal" is used herein to indicate that the vertical load is within a threshold percentage (e.g., 2%-5%) from a desired load (e.g., 14,000 lbs).

As mentioned above, the TLTV 300, and particularly the holding device 400 thereof, may include the torque sensor 416 and the force sensor 412. These sensors are calibrated on a periodic basis to ensure their accuracy and proper operation of the TLTV 300.

Referring back to FIG. 15, at block 1506, the method 1500 includes applying a predefined longitudinal force to a torque-neutral point on the shaft such that the predefined longitudinal force is applied to the shaft without applying a torque thereto. As described above, the shaft 1100 of the replicated nose landing gear 704 may include an interface with the bolt pattern 1304 located a torque-neutral point to facilitate applying a longitudinal force without applying a torque to the replicated nose landing gear 704.

Figure 17:
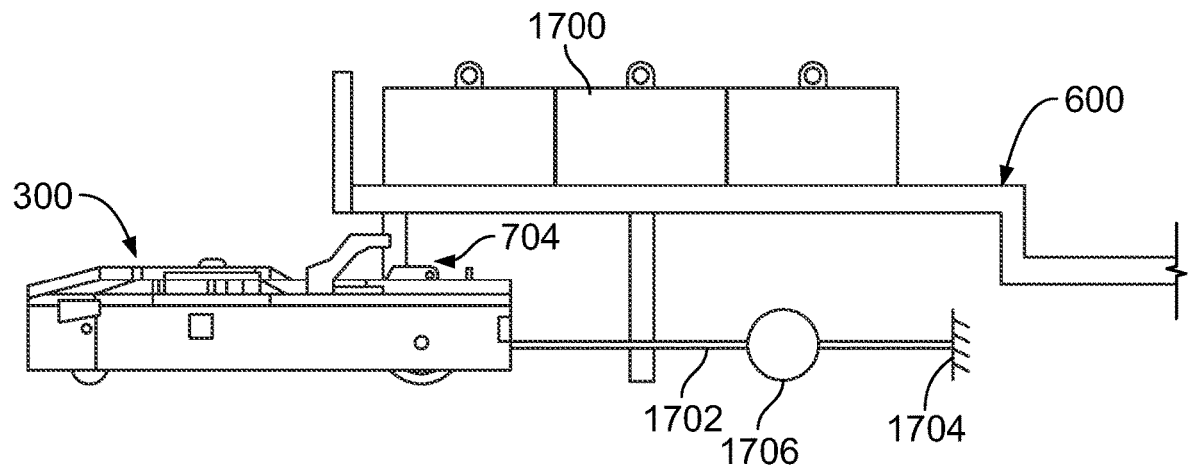
FIG. 17 illustrates applying a longitudinal force to a replicated nose landing gear, in accordance with an example implementation.

FIG. 17 illustrates applying a longitudinal force to the replicated nose landing gear 704, in accordance with an example implementation. As shown, the TLTV 300 is engaged with the replicated nose landing gear 704. Weights 1700 are mounted to the deck of the trailer 600 to simulate actual weight of an aircraft. A sling 1702 is coupled to the torque-neutral point on the shaft 1100 and connects the replicated nose landing gear 704 to a fixed structure 1704. A force scale, load cell, or dynamometer 1706 is connected inline with the sling 1702 to indicate the longitudinal force applied through the sling 1702.

If the TLTV 300 is driven forward, and due to the sling 1702 being fixed at the fixed structure 1704, a longitudinal pulling force will be applied to the replicated nose landing gear 704. Thus, the TLTV 300 could be driven forward until a particular longitudinal pulling force level (e.g., an alarm load limit) is reached as indicated by the dynamometer 1706. The achieved pulling force indicated by the dynamometer 1706 could then be recorded or stored in a memory of a computing device in communication with the dynamometer 1706. This process could be repeated several times to verify repeatability.

Referring back to FIG. 15, at block 1508, the method 1500 includes determining, by a computing device, a reading of the force sensor of the tow vehicle. A computing device could be in communication with the force sensor 412 coupled to the holding device 400 of the TLTV 300. The computing device may thus monitor readouts or measurements obtained by the force sensor 412 in real time for later comparison with the forces indicated by the dynamometer 1706.

At block 1510, the method 1500 includes applying a predefined torque on the shaft. The predefined torque could be applied to the shaft 1100 of the replicated nose landing gear 704 in several ways. For example, a cantilevered bar, e.g., the cantilevered bar 1400, could be coupled to the shaft 1100 of the replicated nose landing gear 704 to facilitate applying the predefined torque.

FIG. 18 is a flowchart of a method for use with the method 1500, in accordance with an example implementation. At block 1512, the method includes applying a second predefined longitudinal force at a particular point on the cantilevered beam. With this configuration, the predefined torque is determined based on the second predefined longitudinal force and a distance between the particular point on the cantilevered beam and a center of the shaft of the replicated nose landing gear.

FIG. 19 illustrates applying a torque to the replicated nose landing gear 704, in accordance with an example implementation. The configuration shown in FIG. 19 is similar to the configuration of FIG. 17 in that a longitudinal force is applied through the sling 1702, which is coupled at one end thereof to the fixed structure 1704. However, in the configuration of FIG. 19, the other end of the sling 1702 is coupled to the cantilevered bar 1400 at a particular point 1900. The point 1900 is at a particular distance "d" from a center of the shaft 1100 of the replicated nose landing gear 704. Thus, the torque applied to the replicated nose landing gear 704 is equal to the longitudinal force applied on the sling 1702 multiplied by the distance "d."

If the TLTV 300 is driven forward, and due to the sling 1702 being fixed at the fixed structure 1704, a longitudinal force will be applied at the point 1900, thus applying a torque to the replicated nose landing gear 704. Thus, the TLTV 300 could be driven forward until a particular longitudinal force level is reached as indicated by the dynamometer 1706. The achieved force indicated by the dynamometer 1706 could be multiplied by the distance "d" to determine the torque, which could be recorded or stored in a memory of the computing device in communication with the dynamometer 1706. This process could be repeated several times in clockwise and counter-clockwise directions to verify repeatability.

This method of applying force or torque to the replicated nose landing gear 704 as described with respect to blocks 1506 and 1510 of the method 1500 is presented herein as an example for illustration only, and other methods could be used. For example, a heavy object could be coupled to the cantilevered bar 1400 to apply the longitudinal force. In another example, the sling 1702 could be coupled to movable heavy equipment instead of the fixed structure 1704. The heavy equipment could be used to apply a force to the sling 1702 while the TLTV 300 remains stationary. Other methods are possible.

Referring back to FIG. 15, at block 1516, the method 1500 includes determining, by the computing device, a reading of the torque sensor of the tow vehicle. The computing device could be in communication with the torque sensor 416 coupled to the holding device 400 of the TLTV 300. The computing device may monitor readouts or measurements obtained by the torque sensor 416 in real time for later comparison with the torques determined by multiplying the force indicated by the dynamometer 1706 with the distance "d."

At block 1516, the method 1500 includes calibrating, by the computing device, (i) the force sensor based on a comparison of the reading of the force sensor and the predefined longitudinal force, and (ii) the torque sensor based on a comparison of the reading of the torque sensor and the predefined torque.

For the force sensor 412, if the measurement obtained thereby matches, or is within a threshold value (e.g., ±1%) from, the value indicated by the dynamometer 1706, then the sensor 412 may be considered operational and certified. Similarly, if the measurement obtained by the torque sensor 416 matches, or is within at threshold value (e.g., ±1%), the value indicated by the dynamometer 1706 multiplied by the distance "d", then the sensor 416 may be considered operational and certified. However, if there are discrepancies due, for example, to sensor drift, then the output of the sensors 412 and 416 could be adjusted to correct the discrepancies. For instance, an offset could be applied to measurements obtained by the sensors 412 and 416 so they match the reading of the dynamometer 1706. This calibration process could be repeated on a periodic basis to make periodic corrections to the sensors 412 and 416 to ensure the accuracy of their measurements.

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method of assembling an apparatus configured to couple to a trailer and a tow vehicle, the method comprising:
providing a frame, wherein the frame comprises a removable disk coupled thereto;
mounting one or more clamps to the frame;
coupling the frame to an underplate of the trailer via the one or more clamps;
coupling the removable disk of the frame to a king pin of the trailer;
coupling a first end of a shaft to the frame such that the shaft is rotatably mounted to the frame at the first end of the shaft; and
coupling a second end of the shaft to a replicated element of a vehicle to be towed, wherein the replicated element is configured to engage the tow vehicle.

2. The method of claim 1, further comprising:
mounting an outer race of a slew bearing to the frame, wherein coupling the first end of the shaft to the frame comprises coupling the first end of the shaft to an inner race of the slew bearing, thereby allowing the shaft and the replicated element to rotate relative to the frame.

3. The method of claim 1, wherein the tow vehicle is an aircraft tow vehicle, wherein the replicated element comprises at least one replicated aircraft wheel, wherein coupling the second end of the shaft to the replicated element of the vehicle to be towed comprises:
coupling the second end of the shaft to the at least one replicated aircraft wheel to form a replicated nose landing gear.

4. The method of claim 3, further comprising:
mounting an axle through the second end of the shaft, wherein coupling the second end of the shaft to the at least one replicated aircraft wheel comprises mounting two replicated aircraft wheels to the axle.

5. The method of claim 1, further comprising:
coupling a cantilevered bar to the shaft to facilitate applying a torque on the shaft and the replicated element coupled thereto.

6. The method of claim 1, wherein the trailer is a lowboy trailer, and wherein coupling the frame to the underplate of the lowboy trailer via the one or more clamps comprises coupling the frame to a raised deck portion of the lowboy trailer.

7. The method of claim 1, wherein the frame comprises at least one beam and a top plate coupled to the at least one beam, and wherein mounting the one or more clamps to the frame comprises mounting the one or more clamps to the at least one beam of the top plate.

8. The method of claim 7, further comprising:
coupling two forklift pockets to the at least one beam of the frame to facilitate handling the apparatus with a forklift.

9. The method of claim 8, wherein the frame comprises two parallel beams and wherein coupling the two forklift pockets to the frame comprises coupling each of the two forklift pockets to the two parallel beams.

\* \* \* \* \*